UNITED STATES PATENT OFFICE.

JAMES R. CAMPBELL, OF SCOTTDALE, PENNSYLVANIA.

PLANT STIMULANTS AND FERTILIZERS.

1,384,990.   Specification of Letters Patent.   Patented July 19, 1921.

No Drawing.   Application filed May 22, 1915. Serial No. 29,887.

*To all whom it may concern:*

Be it known that I, JAMES R. CAMPBELL, a citizen of the United States, and resident of Scottdale, in the county of Westmoreland and State of Pennsylvania, have invented a certain new and useful Plant Stimulant and Fertilizer, of which the following is a specification.

My invention relates to fertilizers used in enriching the soil, and one object of the invention is to provide a fertilizer of novel composition, by the use of which plant growth is stimulated.

Another object of this invention is the production of a fertilizer or fertilizer constituent which is derived from the acid drainage water from mines, a hitherto waste product.

Still further objects of the invention will be made apparent in the detailed description of the invention and be particularly pointed out in the appended claims.

The invention broadly consists in a fertilizer or fertilizer constituent containing basic ferric sulfate and having a filler formed of calcareous material. The invention more specifically consists in a mixture of the precipitate derived from neutralized drainage water from mines and ground limestone, blast furnace slag, basic open hearth furnace slag, or similar calcareous materials.

In the production of the precipitate used in making my improved fertilizer, the waste water drained from mines is treated with finely divided limestone or other calcareous material, so as to neutralize the sulfuric acid in the raw mine water and thereby form or obtain a precipitate which is afterward separated from the body of treated mine water.

When the free sulfuric acid ($H_2SO_4$) in the drainage water from mines (usually from 10 to 25 or possibly 30 per cent. of the total apparent acidity) is neutralized with calcite ($CaCo_3$), or calcium carbonate, or other calcareous substance, large quantities of the iron salts present in solution and in suspension in the mine water are thrown down or precipitated as basic ferric sulfate ($2Fe_2(SO_4)_3 + Fe_2(OH)_6$), according to the reaction $$H_2SO_4 + CaCO_3 = CaSO_4 + H_2O + CO_2,$$

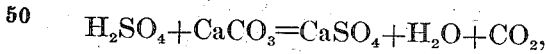

and the phosphoric acid ($P_2O_5$) present in the mine water is precipitated as calcium phosphate.

The amount of phosphoric acid varies up to as much as 4 or 5 per cent. by weight of the precipitate, the quantity depending upon the composition of the particular mine water being treated. Water from a mine producing high phosphorous coal yields a precipitate which is high in phosphorus in the form of calcium phosphate. When basic open hearth furnace slag is used as the filler for the precipitate, the phosphorous content of the mixture may be even higher.

In one process of producing the precipitate, limestone or other calcareous material in excess of that amount required for neutralization of the free acid in the water will be added to the mine water, so that the ferric sulfate may be entirely decomposed with the formation of calcium sulfate and iron hydroxid. And by the use of an excess of calcareous material the precipitate may be made to contain up to from 15 to 20 per cent. of calcium sulfate, the calcium sulfate enhancing the fertilizing value. In carrying this principle further, a filler of finely ground limestone will be added to the precipitate in making a composition to be applied to the soil as a filler. When an excess of calcareous material over the amount required to neutralize the free acid is added to the raw mine water, and (as will be known beforehand) sufficient combined sulfuric anhydrid ($SO_3$) is present in the water as ferric sulfate, calcium sulfate will be precipitated beyond its solubility in the water.

In forming the precipitate used for making my improved fertilizer, such excess of calcareous material may be added to mine waters which are rich or heavily impregnated, that the precipitate will contain up to as much as 20 per cent. calcium sulfate.

In a modified process of producing the precipitate, limestone or other calcareous material, preferably in a finely divided state, will be added to the water in amounts sufficient to just neutralize the sulfuric acid in the water. In such case additional limestone or other calcareous material can be added later to the precipitate as the filler when making a fertilizer.

The value of the precipitate as a stimulant and fertilizer is believed to be dependent upon the action of the iron in the basic ferric sulfate in stimulating plant growth, the biological effect on the soil bacteria the amount of calcium sulfate which the fertilizer is made to contain and upon the phosphoric acid content which invariably is present.

The composition of my improved fertilizer may vary as follows:—precipitate (containing up to 5 per cent. phosphoric acid) 20 to 50 parts and calcareous material or other filler 80 to 50 parts.

A desirable composition which has proved effective is:—Precipitate 20 parts and calcareous material or filler, 80 parts.

In using fertilizer of this composition 200 pounds, more or less, of the mixture per acre is employed, or a mixture is made of such other proportions that there will be at least 20 pounds of the precipitate used to the acre.

Having described my invention, what I claim is—

1. A plant stimulant and fertilizer containing precipitate derived from neutralized mine water, and a filler of calcareous material.

2. A plant stimulant and fertilizer consisting of from 20 to 50 per cent. precipitate derived from neutralized mine water, and 80 to 50 per cent. calcareous material.

3. A plant stimulant and fertilizer consisting of 20 per cent. precipitate derived from neutralized mine water, and 80 per cent. calcite.

4. A fertilizer derived from acid mine water and consisting of at least 20 per cent. precipitate from the water, and a filler of calcareous material.

5. A plant stimulant and fertilizer composed of a precipitate derived from neutralized mine water and containing an iron salt, and a filler of calcareous material.

6. A plant stimulant and fertilizer composed of from 20 to 50 per cent. of precipitate derived from neutralized mine water and containing a ferric salt and 80 to 50 per cent. calcareous material.

7. A plant stimulant and fertilizer composed of 20 parts of precipitate derived from neutralized mine water, and containing a ferric salt and 80 parts calcareous material.

8. A fertilizer material comprising as an essential constituent thereof, a basic ferric sulfate and such organic matter as is a constituent of mine waters.

9. A fertilizer material comprising as an essential constituent thereof, a basic ferric sulfate and such organic matter as is a constituent of mine water, together with larger amounts of other fertilizing and extending materials.

10. As a new article of manufacture, a precipitate derived from neutralized acid mine water and containing basic ferric sulfate.

In testimony whereof I have hereunto set my hand.

JAMES R. CAMPBELL.

Witnesses:
O. F. STRAUSE,
G. E. HUTTELMAIR.